United States Patent
Liu et al.

(10) Patent No.: US 10,798,679 B2
(45) Date of Patent: Oct. 6, 2020

(54) PAGING METHOD, PAGING MONITORING METHOD, DEVICE AND APPARATUS, AND STORAGE MEDIUM

(71) Applicant: ZTE CORPORATION, Shenzhen, Guangdong (CN)

(72) Inventors: Xu Liu, Shenzhen (CN); Xiubin Sha, Shenzhen (CN); Bo Dai, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 16/499,183

(22) PCT Filed: Jan. 23, 2018

(86) PCT No.: PCT/CN2018/073872
§ 371 (c)(1),
(2) Date: Sep. 27, 2019

(87) PCT Pub. No.: WO2018/177004
PCT Pub. Date: Apr. 10, 2018

(65) Prior Publication Data
US 2020/0029303 A1     Jan. 23, 2020

(30) Foreign Application Priority Data
Mar. 28, 2017 (CN) .......................... 2017 1 0193472

(51) Int. Cl.
*H04W 68/02* (2009.01)
*H04W 28/02* (2009.01)
(Continued)

(52) U.S. Cl.
CPC ....... *H04W 68/02* (2013.01); *H04W 28/0215* (2013.01); *H04W 52/0229* (2013.01);
(Continued)

(58) Field of Classification Search
CPC . H04W 68/02; H04W 68/04; H04W 28/0215; H04W 52/0229; H04W 72/042;
(Continued)

(56) References Cited

U.S. PATENT DOCUMENTS 9,615,351 B2 *  4/2017  Zhu ................... H04W 64/006
9,974,049 B2 *  5/2018  Burbidge .............. H04W 68/02
(Continued)

FOREIGN PATENT DOCUMENTS

| CN | 101795461 A | 8/2010 |
|---|---|---|
| CN | 102932883 A | 2/2013 |
| CN | 106535304 A | 3/2017 |

OTHER PUBLICATIONS

International Search Report of Application No. PCT/CN2018/073872—4 pages (dated Mar. 27, 2018).

*Primary Examiner* — Magdi Elhag
(74) *Attorney, Agent, or Firm* — Knobbe, Martens, Olson & Bear, LLP

(57) ABSTRACT

Provided are a paging method, paging listening method, apparatus and equipment, and storage medium. The paging method includes: a base station selects a paging approach according to paging capacity of a terminal and paging capacity supported by the base station; the base station sends a paging message through the selected paging approach.

11 Claims, 3 Drawing Sheets

(51) Int. Cl.
*H04W 52/02* (2009.01)
*H04W 68/04* (2009.01)
*H04W 72/04* (2009.01)
*H04W 72/12* (2009.01)

(52) U.S. Cl.
CPC ......... *H04W 68/04* (2013.01); *H04W 72/042* (2013.01); *H04W 72/048* (2013.01); *H04W 72/1247* (2013.01); *H04W 72/1252* (2013.01); *H04W 72/1257* (2013.01)

(58) Field of Classification Search
CPC ........... H04W 72/048; H04W 72/1247; H04W 72/1252; H04W 72/1257
See application file for complete search history.

(56) References Cited

U.S. PATENT DOCUMENTS

| | | | |
|---|---|---|---|
| 10,231,210 B2* | 3/2019 | Johansson | H04W 68/04 |
| 10,602,481 B2* | 3/2020 | Chen | H04W 4/70 |
| 2010/0317374 A1 | 12/2010 | Alpert et al. | |
| 2016/0205659 A1* | 7/2016 | Bergman | H04L 1/1812 |
| | | | 370/252 |
| 2016/0309448 A1* | 10/2016 | Truelove | H04W 8/22 |
| 2016/0309449 A1* | 10/2016 | Diachina | H04W 68/08 |
| 2018/0097541 A1* | 4/2018 | Bhattad | H04L 5/0012 |
| 2018/0206188 A1* | 7/2018 | Nam | H04W 52/0203 |
| 2018/0227880 A1* | 8/2018 | Su | H04W 76/27 |
| 2018/0270788 A1* | 9/2018 | Johansson | H04W 68/02 |
| 2018/0376451 A1* | 12/2018 | Wong | H04W 68/02 |
| 2019/0239189 A1* | 8/2019 | Hwang | H04W 52/0229 |
| 2020/0029302 A1* | 1/2020 | Cox | H04W 68/02 |
| 2020/0169956 A1* | 5/2020 | Sun | H04W 72/042 |

* cited by examiner

PAGING METHOD, PAGING MONITORING METHOD, DEVICE AND APPARATUS, AND STORAGE MEDIUM

CROSS-REFERENCE TO RELATED APPLICATIONS

This is a National Stage Application, filed under 35 U.S.C. 371, of International Patent Application No. PCT/CN2018/073872, filed on Jan. 23, 2018, which claims priority to Chinese patent application No. 201710193472.7 filed on Mar. 28, 2017, contents of both of which are incorporated herein by reference in their entireties.

TECHNICAL FIELD

The present disclosure relates to the field of wireless communication technology and, in particular, to a paging method, paging listening method, apparatus and equipment, and storage medium.

BACKGROUND

The rapid development of Mobile Internet, Internet of Things (IoT) and other business applications has become the main driving force to promote the development of the fifth generation mobile communication technology (5G). The 5G is urgently required to have an access rate comparable to an optical fiber, capacity to connect hundreds of billions of devices, perfect real-time experience and wireless broadband access capacity at anytime and anywhere. In addition, important indicators such as energy consumption efficiency, spectrum efficiency and peak rate also need to be comprehensively considered in the design of a 5G system. China has established an IMT-2020 (5G) promotion group in 2013 to promote the development of the 5G. According to an overall international situation, a 5G vision, a key capacity requirement and spectrum planning are expected to be formed in 2015. After that, 5G standardization will be launched and the 5G is planned to be commercially used after 2020. In terms of international standards, technical standards of advanced long term evolution (LTE-Advanced) are mainly set by the international standardization organization in the third generation partnership project (3GPP). Industry primarily believes that the research of the 5G standards will be launched in a phase of 3GPP R14.

In the future mobile network applications, the traffic demand, the number of terminals and the types of terminals will all show an explosive growth trend. As one of important scenarios and technical means of the 5G, Machine Type Communication (MTC) is attracting more and more attention. In a MTC topic, a research sub-topic of Narrowband-Internet of Things (NB-IoT) is proposed for characteristics of a low-cost low-throughput terminal. That is, the frequency band of 200 kHZ is used for providing a low-throughput wireless communication service for a low-cost NB-IoT terminal.

When downlink data arrives, a core network will trigger a paging message carrying downlink data arrival indication information. A terminal needs to listen for a Physical Downlink Control Channel (PDCCH) at each paging occasion. According to whether the PDCCH carries a Paging-Radio Network Temporary Identifier (P-RNTI) matching with the terminal, whether the paging message is sent to the terminal at the paging occasion can be determined. In a case where the terminal is a NB-IoT terminal or an enhanced Machine Type Communication (eMTC) terminal, when listening for the paging message, the terminal needs to wake up and to listen for the paging message at the paging occasion, no matter if the paging message exists. This will bring large power consumption to a low-power terminal.

SUMMARY

The present disclosure provides a paging method, paging listening method, apparatus and equipment, and storage medium, so as to overcome the limitation of power consumption of a low-power terminal.

A paging method includes steps described below.

A base station selects a paging approach according to paging capacity of a terminal and paging capacity supported by the base station.

The base station sends a paging message through the selected paging approach.

In an embodiment, in a case where the terminal is a Narrowband-Internet of Things (NB-IoT) terminal, the paging capacity of the terminal includes whether the terminal supports paging with a wake-up signal; in a case where the terminal is an Enhanced Machine Type of Communication (eMTC) terminal, the paging capacity of the terminal includes whether the terminal supports listening for the paging message on a number M of physical resource blocks (PRBs), where M is a positive integer less than 7.

In an embodiment, the paging capacity supported by the base station includes whether an NB-IoT wireless interface supports paging with the wake-up signal, and whether an eMTC wireless interface supports sending the paging message on a number N of PRBs, where N is a positive integer less than 7.

In an embodiment, the paging method further includes a step described below.

The base station issues the paging capacity supported by the base station in at least one of manners described below.

The base station issues the paging capacity supported by the base station through a broadcast message.

The base station delivers the paging capacity supported by the base station through a dedicated signaling.

The paging capacity supported by the base station is represented as at least one of paging capacity information or paging approach preference information.

In an embodiment, the manner in which the base station delivers the paging capacity supported by the base station through the dedicated signaling includes a step described below.

The base station delivers the paging capacity supported by the base station to the terminal through the dedicated signaling, and delivers the paging capacity supported by the base station to a Mobility Management Entity (MME) through an S1 interface.

The paging method further includes a step described below.

The base station acquires the paging capacity supported by the base station from a paging message sent by the MME.

In an embodiment, the base station supports at least one wireless access scheme, where the at least one wireless access scheme includes a wireless access scheme with coverage enhancement (CE) and a wireless access scheme without CE.

In an embodiment, the paging method further includes a step described below.

The base station indicates a resident mode to the terminal in at least one of manners described below.

The base station broadcasts the resident mode through a system message.

The base station indicates the resident mode through the dedicated signaling.

The resident mode is represented as at least one of resident mode information or resident mode preference indication information.

In an embodiment, the manner in which the base station indicates the resident mode through the dedicated signaling includes a step described below.

The base station delivers resident mode information to the terminal through the dedicated signaling, and delivers the resident mode to the MME through the S1 interface.

The paging method further includes a step described below.

The base station acquires the resident mode from the paging message sent by the MME.

In an embodiment, the step in which the base station sends the paging message through the selected paging approach includes steps described below.

The base station determines, according to the resident mode indicated to the terminal, a system for the terminal in an idle status to reside or reside in priority, and sends the paging message in the system resided or resided in priority by the terminal.

In a case of sending the paging message in a system resided in priority by the terminal, the base station continues paging in at least one system supported by both the terminal and the base station after a paging failure.

In an embodiment, the step in which the system for the terminal in the idle status to reside or reside in priority is determined includes a step described below.

In a case where both the base station and the terminal support the wireless access scheme with CE, the base station determines that the terminal resides in priority in the wireless access scheme with CE. In a case where the base station does not support the wireless access scheme with CE, the base station determines that the terminal resides in a Long Term Evolution (LTE) scheme.

In an embodiment, the step in which the base station selects the paging approach according to the paging capacity of the terminal and the paging capacity supported by the base station includes a step described below.

The base station receives and demodulates a paging message issued by a core network for the paging capacity of the terminal. In a case where the terminal is the NB-IoT terminal, the terminal supports paging with the wake-up signal and the base station supports paging with the wake-up signal in an NB-IoT system, the base station selects a paging approach with the wake-up signal for paging. In a case where the terminal is the eMTC terminal, the terminal supports listening for the paging message on the M PRBs and the base station supports sending the paging message on the N PRBs in an eMTC system, the base station selects to send the paging message on the N PRBs, where M and N are positive integers less than 7 and M is greater than or equal to N.

In an embodiment, M is equal to 1 and N is equal to 1.

An embodiment of the present disclosure further provides a paging listening method. The paging listening method includes steps described below.

A terminal determines a paging listening approach according to paging capacity supported by the terminal and paging capacity supported by a base station.

The terminal listens for a paging message according to the determined paging listening approach.

In an embodiment, before the terminal determines the paging listening approach according to the paging capacity supported by the terminal and the paging capacity supported by the base station, the paging listening method further includes a step described below.

The terminal acquires the paging capacity supported by the base station in at least one of manners described below.

The terminal acquires the paging capacity supported by the base station through receiving a system message carrying the paging capacity.

The terminal acquires the paging capacity supported by the base station through demodulating a dedicated signaling for the paging capacity carried by the dedicated signaling.

The paging capacity supported by the base station is represented as at least one of paging capacity information or paging approach preference information.

In an embodiment, the paging listening method further includes a step described below.

The terminal receives a resident mode indicated by the base station in at least one of manners described below.

The terminal receives the resident mode carried by a system message from the base station.

The terminal receives the resident mode carried by a dedicated signaling from the base station.

The resident mode is represented as at least one of resident mode information or resident mode preference indication information.

In an embodiment, the paging listening method further includes a step described below.

In a case where the terminal is a Long Term Evolution (LTE) terminal supporting coverage enhancement (CE), is compatible with an LTE system and an Enhanced Machine Type of Communication (eMTC) system, and is capable of listening for the paging message on a Physical Downlink Control Channel (PDCCH) or a Machine Physical Downlink Control Channel (MPDCCH) of inter-machine communication, the terminal determines to reside in the eMTC system in priority and listens for the paging message on the MPDCCH in priority according to the received resident mode indicated by the base station.

In an embodiment, the step in which the terminal determines the paging listening approach according to the paging capacity supported by the terminal and the paging capacity supported by the base station includes steps described below.

In a case where the terminal is a Narrowband-Internet of Things (NB-IoT) terminal, and the terminal and the base station support paging with a wake-up signal, the terminal determines to listen for the wake-up signal and whether to listen for the paging message at a paging occasion.

In a case where the terminal is an eMTC terminal, the terminal supports listening for the paging message on a number M of physical resource blocks (PRBs) and the base station supports sending the paging message on a number N of PRBs, the terminal determines to listen for the paging message on the M PRBs, wherein M and N are positive integers less than 7 and M is greater than or equal to N.

In an embodiment, M is equal to 1 and N is equal to 1.

In an embodiment, the paging listening method further includes a step described below.

The terminal reports the paging capacity of the terminal in at least one of manners described below.

The terminal performs pass-through of the paging capacity carried by a non-access stratum signaling to the base station, to enable the base station to deliver the paging capacity to a Mobility Management Entity (MME) through an S1 interface.

The terminal delivers the paging capacity carried by an access stratum signaling to the base station, to enable the base station to deliver the paging capacity to the MME through the S1 interface.

A paging apparatus is configured in a base station. The paging apparatus includes a selection module and a sending module.

The selection module is configured to select a paging approach according to paging capacity of a terminal and paging capacity supported by the base station.

The sending module is configured to send a paging message through the selected paging approach.

In an embodiment, the paging apparatus further includes an indication module.

The indication module is configured to indicate a resident mode to the terminal in at least one of manners described below.

The indication module broadcasts the resident mode through a system message.

The indication module indicates the resident mode through a dedicated signaling.

The resident mode is represented as at least one of resident mode information or resident mode preference indication information.

In an embodiment, the sending module is configured to determine, according to the resident mode indicated to the terminal, a system for the terminal in an idle status to reside or reside in priority, and send the paging message in the system resided or resided in priority by the terminal. In a case of sending the paging message in a system resided in priority by the terminal, the sending module continues paging in at least one system supported by both the terminal and the base station after a paging failure.

In an embodiment, the selection module is configured to receive and demodulate a paging message issued by a core network for the paging capacity of the terminal. In a case where the terminal is a Narrowband-Internet of Things (NB-IoT) terminal, the terminal supports paging with a wake-up signal and the base station supports paging with the wake-up signal in an NB-IoT system, the selection module selects a paging approach with the wake-up signal for paging. In a case where the terminal is an Enhanced Machine Type of Communication (eMTC) terminal, the terminal supports listening for the paging message on a number M of physical resource blocks (PRBs) and the base station supports sending the paging message on a number N of PRBs in an eMTC system, the selection module selects to send the paging message on the N PRBs, where M and N are positive integers less than 7 and M is greater than or equal to N.

In an embodiment, M is equal to 1 and N is equal to 1.

A paging equipment is configured in a base station. The paging equipment includes a memory and a processor.

Executable instructions are included in the memory. The processor, when executing the executable instructions, performs operations described below.

A paging approach is selected according to paging capacity of a terminal and paging capacity supported by the base station.

A paging message is sent through the selected paging approach.

In an embodiment, the processor, when executing the executable instructions, further performs an operation described below.

A resident mode is indicated to the terminal in at least one of manners described below.

The resident mode is broadcasted through a system message.

The resident mode is indicated through a dedicated signaling.

The resident mode is represented as at least one of resident mode information or resident mode preference indication information.

In an embodiment, the operation in which the paging message is sent through the selected paging approach includes operations described below.

The base station determines, according to the resident mode indicated to the terminal, a system for the terminal in an idle status to reside or reside in priority, and sends the paging message in the system resided or resided in priority by the terminal.

In a case of sending the paging message in a system resided in priority by the terminal, the base station continues paging in at least one system supported by both the terminal and the base station after a paging failure.

In an embodiment, the operation in which the paging approach is selected according to the paging capacity of the terminal and the paging capacity supported by the base station includes an operation described below.

The paging message issued by a core network is received and demodulated for the paging capacity of the terminal. In a case where the terminal is a Narrowband-Internet of Things (NB-IoT) terminal, the terminal supports paging with a wake-up signal and the base station supports paging with the wake-up signal in an NB-IoT system, a paging approach with the wake-up signal is selected for paging. In a case where the terminal is an Enhanced Machine Type of Communication (eMTC) terminal, the terminal supports listening for the paging message on a number M of physical resource blocks (PRBs) and the base station supports sending the paging message on a number N of PRBs in an eMTC system, the N PRBs are selected for sending the paging message, where M and N are positive integers less than 7 and M is greater than or equal to N.

In an embodiment, M is equal to 1 and N is equal to 1.

A paging listening apparatus is configured in a terminal. The paging listening apparatus includes a determination module and a listening module.

The determination module is configured to determine a paging listening approach according to paging capacity supported by the terminal and paging capacity supported by a base station.

The listening module is configured to listen for a paging message according to the determined paging listening approach.

In an embodiment, the paging listening apparatus further includes a receiving module.

The receiving module is configured to receive a resident mode indicated by the base station in least one of manners described below.

The receiving module receives the resident mode carried by a system message from the base station.

The receiving module receives the resident mode carried by a dedicated signaling from the base station.

The resident mode is represented as at least one of resident mode information or resident mode preference indication information.

In an embodiment, the paging listening apparatus further includes a resident system determination module.

The resident system determination module is configured to, in a case where the terminal is a Long Term Evolution (LTE) terminal supporting coverage enhancement (CE), is compatible with an LTE system and an Enhanced Machine Type of Communication (eMTC) system, and is capable of listening for the paging message on a Physical Downlink Control Channel (PDCCH) or a Machine Physical Downlink Control Channel (MPDCCH) of inter-machine communication, determine to reside in the eMTC system in priority and listen for the paging message on the MPDCCH in priority according to the received resident mode indicated by the base station.

In an embodiment, the determination module is configured to determine the paging listening approach according to the paging capacity supported by the terminal and the paging capacity supported by the base station in at least one of manners described below.

In a case where the terminal is a Narrowband-Internet of Things (NB-IoT) terminal, and the terminal and the base station support paging with a wake-up signal, the determination module determines to listen for the wake-up signal and determines whether to listen for the paging message at a paging occasion.

In a case where the terminal is an eMTC terminal, the terminal supports listening for the paging message on a number M of physical resource blocks (PRBs) and the base station supports sending the paging message on a number N of PRBs, the determination module determines to listen for the paging message on the M PRBs, where M and N is a positive integer less than 7 and M is greater than or equal to N.

In an embodiment, M is equal to 1 and N is equal to 1.

A paging listening equipment is configured in a terminal. The paging listening equipment includes a memory and a processor.

Executable instructions are included in the memory. The processor, when executing the executable instructions, performs operations described below.

A paging listening approach is determined according to paging capacity supported by the terminal and paging capacity supported by a base station.

A paging message is listened for according to the determined paging listening approach.

In an embodiment, the processor, when executing the executable instructions, further performs an operation described below.

A resident mode indicated by the base station is received in at least one of manners described below.

The resident mode carried by a system message from the base station is received.

The resident mode carried by a dedicated signaling from the base station is received.

The resident mode is represented as at least one of resident mode information or resident mode preference indication information.

In an embodiment, the processor, when executing the executable instructions, further performs an operation described below.

In a case where the terminal is a Long Term Evolution (LTE) terminal supporting coverage enhancement (CE), is compatible with an LTE system and an Enhanced Machine Type of Communication (eMTC) system, and is capable of listening for the paging message on a Physical Downlink Control Channel (PDCCH) or a Machine Physical Downlink Control Channel (MPDCCH) of inter-machine communication, it is determined to reside in the eMTC system in priority and listen for the paging message on the MPDCCH in priority according to the received resident mode indicated by the base station.

In an embodiment, the operation in which the paging listening approach is determined according to the paging capacity supported by the terminal and the paging capacity supported by the base station includes operations described below.

In a case where the terminal is a Narrowband-Internet of Things (NB-IoT) terminal, and the terminal and the base station support paging with a wake-up signal, it is determined to listen for the wake-up signal and it is determined whether to listen for the paging message at a paging occasion.

In a case where the terminal is an eMTC terminal, the terminal supports listening for the paging message on a number M of physical resource blocks (PRBs) and the base station supports sending the paging message on a number N of PRBs, it is determined to listen for the paging message on the M PRBs, where M and N is a positive integer less than 7 and M is greater than or equal to N.

In an embodiment, M is equal to 1 and N is equal to 1.

The present disclosure further provides a storage medium, where executable programs are stored in the storage medium. The executable programs, when executed by a processor, implement operations described below.

A paging approach is selected according to paging capacity of a terminal and paging capacity supported by a base station. A paging message is sent through the selected paging approach.

The present disclosure further provides a storage medium, where executable programs are stored in the storage medium. The executable programs, when executed by a processor, implement operations described below.

A paging listening approach is determined according to paging capacity supported by a terminal and paging capacity supported by a base station. A paging message is listened for according to the determined paging listening approach.

According to a requirement of power consumption of a low-power terminal such as a Narrowband-Internet of Things (NB-IoT) terminal and an Enhanced Machine Type of Communication (eMTC) terminal, the present disclosure provides an enhanced paging scheme. The power consumption of the terminal in a process of listening for a paging message can be reduced through the enhancement of a paging approach, so as to solve the limitation of the power consumption of the low-cost terminal.

Other features and advantages of the present disclosure will be described in subsequent specification and, in part, become apparent from the specification or be understood through the implementation of the present disclosure. The purpose and other advantages of the present disclosure may be implemented and acquired by the structure specified in the specification, the claims and the drawings.

DETAILED DESCRIPTION

It should be noted that the embodiments of the present disclosure and features of embodiments may be arbitrarily combined with each other without conflict.

The steps shown in flowcharts of the drawings may be performed in a computer system such as a group of computer-executable instructions. In addition, although logical orders are shown in the flowcharts, in some cases the steps shown or described may be performed in a different order than here.

Figure 1:
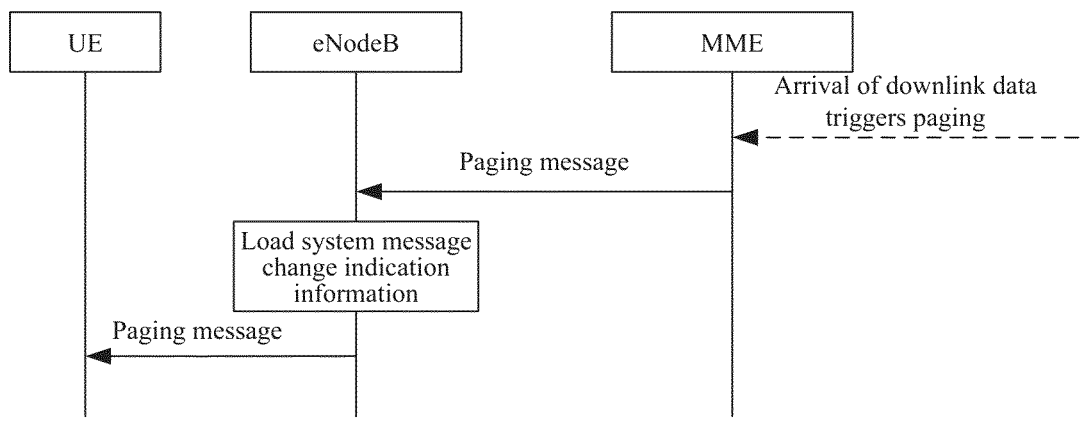
FIG. 1 is a schematic diagram of transmission in paging of a LTE system.

In a LTE system, if data needs to be sent to a terminal in an idle status (e.g., RRC-IDLE), such as a User Equipment (UE), a Mobility Management Entity (MME) needs to send a paging message to all evolved Node B (eNodeB) in a tracking area (TA) in which the UE is registered. After receiving a paging message sent by a core network, the eNodeB determines whether a system message has changed. If the system message has changed, the system message is carried in the paging message. Then, as shown in FIG. 1, the eNodeB sends the paging message to notify the UE. The UE listens for the paging message in a corresponding position according to a calculation formula of a Paging Occasion (PO). After receiving the paging message, the UE initiate a Radio Resource Control (RRC) connection request to receive downlink data. After sending a paging message, the MME determines whether the paging is successfully received by the UE based on whether the UE performs a corresponding action next. If the paging is not successfully received by the UE, the MME will continue paging the UE in next paging cycle.

Figure 2:
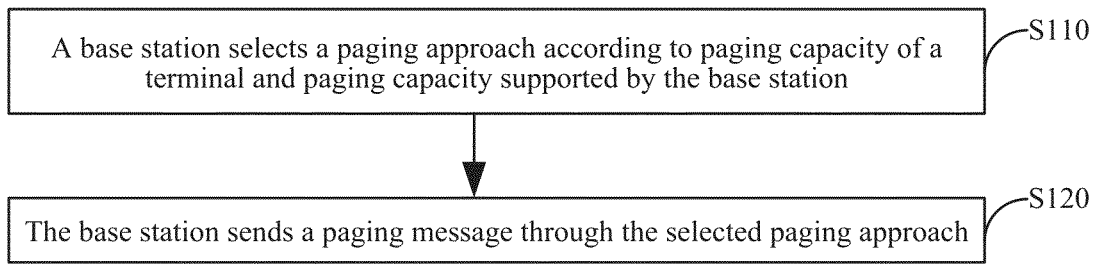
FIG. 2 is a flowchart of a paging method of embodiment 1.

In embodiment 1, as shown in FIG. 2, a paging method includes steps described below, In S110, a base station selects a paging approach according to paging capacity of a terminal and paging capacity supported by the base station.

In S120, the base station sends a paging message through the selected paging approach.

In this embodiment, the base station may select an appropriate paging approach for paging.

In an implementation, in a case where the terminal is a Narrowband-Internet of Things (NB-IoT) terminal, the paging capacity of the terminal may include whether the terminal supports paging with a wake-up signal; in a case where the terminal is an Enhanced Machine Type of Communication (eMTC) terminal, the paging capacity of the terminal may include whether the terminal supports listening for the paging message on a number M of physical resource blocks (PRBs), where M is a positive integer less than 7. M may be, but is not limited to, 1.

In other implementations, the capacity of the terminal may include other contents.

In an implementation, the paging capacity supported by the base station may include whether an NB-IoT wireless interface supports paging with the wake-up signal, and whether an eMTC wireless interface supports sending the paging message on a number N of PRBs, where N is a positive integer less than 7. N may be, but is not limited to, 1.

In other implementations, the paging capacity supported by the base station may include other contents.

In an implementation, the paging capacity supported by the base station may be represented as at least one of paging capacity information or paging approach preference information.

The paging method may further include a step described below.

The base station issues the paging capacity supported by the base station in at least one of manners described below.

The base station issues the paging capacity supported by the base station through a broadcast message.

The base station delivers the paging capacity supported by the base station through a dedicated signaling.

In other implementations, the paging capacity supported by the base station may be represented in other forms, and the base station may issue the paging capacity supported by the base station in other manners.

In this implementation, the manner in which the base station delivers the paging capacity supported by the base station through the dedicated signaling may include steps described below.

The base station delivers the paging capacity supported by the base station to the terminal through the dedicated signaling, and delivers the paging capacity supported by the base station to a Mobility Management Entity (MME) through an S1 interface.

The MME may carry the paging capacity supported by the base station to the base station in the paging message during the subsequent paging process.

Accordingly, the paging method may further include a step described below.

The base station acquires the paging capacity supported by the base station from a paging message sent by the MME.

In an implementation, the base station may support at least one wireless access scheme, where the at least one wireless access scheme includes a wireless access scheme with coverage enhancement (CE) and a wireless access scheme without CE.

In an implementation, the paging method may further include a step described below.

The base station indicates a resident mode to the terminal in at least one of manners described below.

The base station broadcasts the resident mode through a system message.

The base station indicates the resident mode through a dedicated signaling.

The resident mode may be represented as at least one of resident mode information or resident mode preference indication information.

In other implementations, if the resident mode is default, preset or determined according to a preset rule, the base station may not indicate the resident mode to the terminal.

In this implementation, the manner in which the base station delivers the resident mode through the dedicated signaling may include steps described below.

The base station delivers resident mode information to the terminal through the dedicated signaling, and delivers the resident mode to the MME through the S1 interface.

The MME may carry the resident mode to the base station in the paging message during the subsequent paging process.

Accordingly, the paging method may further include a step described below.

The base station acquires the resident mode from the paging message sent by the MME.

In this implementation, the step in which the base station sends the paging message through the selected paging approach may include steps described below.

The base station determines, according to the resident mode indicated to the terminal, a system for the terminal in an idle status to reside or reside in priority, and sends the paging message in the system resided or resided in priority by the terminal.

In a case of sending the paging message in a system resided in priority by the terminal, the base station continues paging in at least one system supported by both the terminal and the base station after a paging failure.

In this implementation, the step in which the base station determines the system for the terminal in the idle status to reside or reside in priority may include a step described below.

In a case where both the base station and the terminal support the wireless access scheme with CE, the base station determines that the terminal resides in priority in the wireless access scheme with CE. In a case where the base station does not support the wireless access scheme with CE, the base station determines that the terminal resides in a Long Term Evolution (LTE) scheme.

In an implementation, the step in which the base station selects the paging approach according to the paging capacity of the terminal and the paging capacity supported by the base station may include a step described below.

The base station receives and demodulates a paging message issued by a core network for the paging capacity of the terminal. In a case where the terminal is the NB-IoT terminal, the terminal supports paging with the wake-up signal and the base station supports paging with the wake-up signal in an NB-IoT system, the base station selects a paging approach with the wake-up signal for paging. In a case where the terminal is the eMTC terminal, the terminal supports listening for the paging message on the M PRBs and the base station supports sending the paging message on the N PRBs in an eMTC system, the base station selects to send the paging message on the N PRBs, where M and N are positive integers less than 7 and M is greater than or equal to N.

In a case where M is equal to 1 and N is equal to 1, this implementation is equivalent to steps described below.

In a case where the terminal is the eMTC terminal, the terminal supports listening for the paging message on one PRB and the base station supports sending the paging message on one PRB, the base station selects to send the paging message on one PRB.

In this implementation, in a case where the terminal is the NB-IoT terminal, and at least one of the terminal or the base station does not support the paging with the wake-up signal, the conventional paging approach may be selected; in a case where the terminal is the eMTC terminal, and at least one of conditions described below is true, the conventional paging approach may be selected: the terminal does not support listening for the paging message on the M (M is a positive integer less than 7) PRBs, or the base station does not support sending the paging message on the N (N is a positive integer less than 7) PRBs, where M is less than N.

In this implementation, in a case where the terminal is the NB-IoT terminal, the paging with the wake-up signal is designed. That is, in a case where the terminal has no data for a long time, the terminal may be informed through the wake-up signal that the terminal dose not listen for the paging message at the subsequent paging occasion, to achieve the purpose of saving power consumption.

In this implementation, in a case where the terminal is the eMTC terminal, the bandwidth of each listening paging reaches 1.4 MHz. Such a large bandwidth will undoubtedly bring a large impact on power consumption for a low-cost terminal such as the eMTC terminal. In this implementation, the paging message is received and sent in a narrow bandwidth, which is beneficial to reduce the power consumption of the eMTC terminal.

Figure 3:
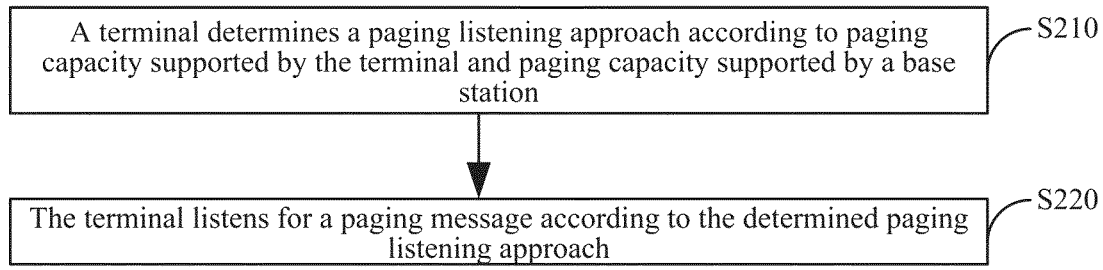
FIG. 3 is a flowchart of a paging listening method of embodiment 2.

In embodiment 2, as shown in FIG. 3, a paging listening method includes steps described below.

In S210, a terminal determines a paging listening approach according to paging capacity supported by the terminal and paging capacity supported by a base station.

In S220, the terminal listens for a paging message according to the determined paging listening approach.

In an implementation, before the terminal determines the paging listening approach according to the paging capacity supported by the terminal and the paging capacity supported by the base station, the paging listening method may further include a step described below.

The terminal acquires the paging capacity supported by the base station in at least one of manners described below.

The terminal acquires the paging capacity supported by the base station through receiving a system message carrying the paging capacity.

The terminal acquires the paging capacity supported by the base station through demodulating a dedicated signaling for the paging capacity carried by the dedicated signaling.

The paging capacity supported by the base station may be represented as at least one of paging capacity information or paging approach preference information.

In an implementation, the paging listening method may further include a step described below.

The terminal receives a resident mode indicated by the base station in at least one of manners described below.

The terminal receives the resident mode carried by a system message from the base station.

The terminal receives the resident mode carried by a dedicated signaling from the base station.

The resident mode may be represented as at least one of resident mode information or resident mode preference indication information.

In this implementation, the paging listening method may further include a step described below.

In a case where the terminal is a Long Term Evolution (LTE) terminal supporting coverage enhancement (CE), is compatible with an LTE system and an Enhanced Machine Type of Communication (eMTC) system, and is capable of listening for the paging message on a Physical Downlink Control Channel (PDCCH) and a Machine Physical Downlink Control Channel (MPDCCH) of inter-machine communication, the terminal determines to reside in the eMTC system in priority and listens for the paging message on the MPDCCH in priority according to the received resident mode indicated by the base station.

In an implementation, the step in which the terminal determines the paging listening approach according to the paging capacity supported by the terminal and the paging capacity supported by the base station may include steps described below.

In a case where the terminal is a Narrowband-Internet of Things (NB-IoT) terminal, and the terminal and the base station support paging with a wake-up signal, the terminal determines to listen for the wake-up signal and determines whether to listen for the paging message at a paging occasion.

In a case where the terminal is an eMTC terminal, the terminal supports listening for the paging message on a number M of physical resource blocks (PRBs) and the base station supports sending the paging message on a number N of PRBs, the terminal determines to listen for the paging message on the M PRBs, where M and N are positive integers less than 7 and M is greater than or equal to N. M may be, but is not limited to, 1.

In an implementation, the paging listening method may further include a step described below.

The terminal reports the paging capacity of the terminal in at least one of manners described below.

The terminal performs pass-through of the paging capacity carried by a non-access stratum signaling to the base station, to enable the base station to deliver the paging capacity to a Mobility Management Entity (MME) through an S1 interface.

The terminal delivers the paging capacity carried by an access stratum signaling to the base station, to enable the base station to deliver the paging capacity to the MME through the S1 interface.

In other implementations, the terminal may also report the paging capacity of the terminal in other manners.

Figure 4:
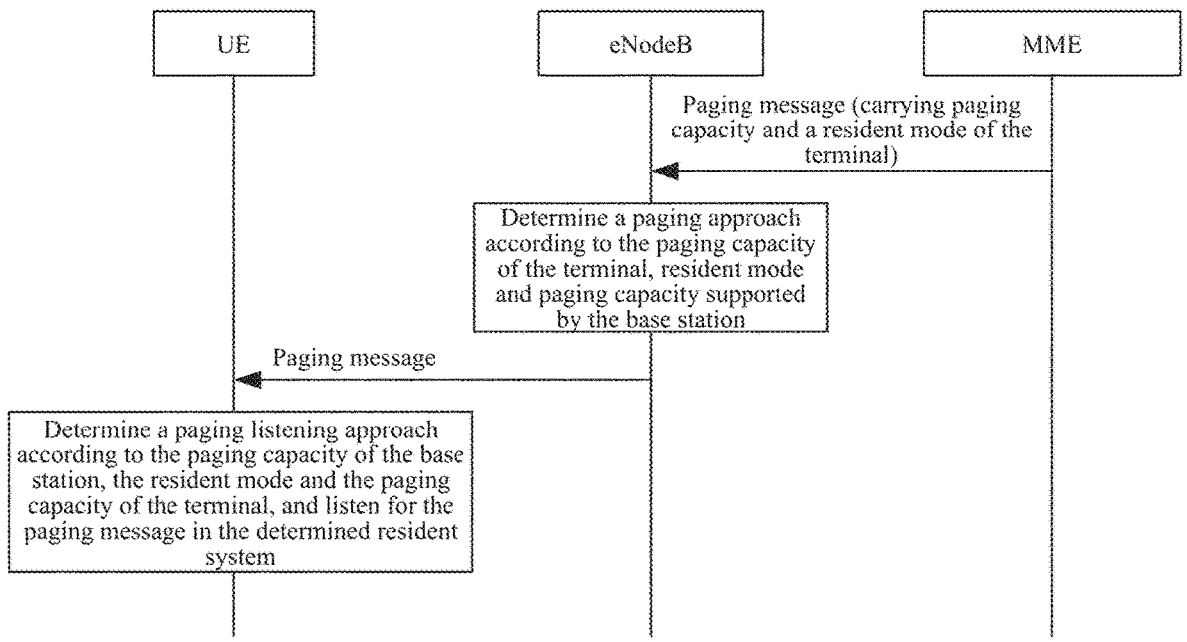
FIG. 4 is a schematic diagram of an enhanced paging process of embodiment 3.

In embodiment 3, as shown in FIG. 4, a paging method includes steps described below.

A Mobility Management Entity (MME) sends a paging message to a base station, where the paging message carries paging capacity of the terminal and a resident mode. In this embodiment, the base station is an eNodeB.

After receiving the paging message sent by the MME, the base station determines a paging approach according to the paging capacity of the terminal, the resident mode, and paging capacity supported by the base station.

The base station sends the paging message to the terminal according to the determined paging approach. In this embodiment, the terminal is UE.

The terminal determines a paging listening approach according to the paging capacity supported by the base station, the resident mode and the paging capacity of the terminal, and listens for the paging message in the corresponding resident mode according to the determined paging listening approach.

This embodiment may be called as an enhanced paging scheme.

Other implementation details of this embodiment may be referred to the embodiments 1 and 2.

The above embodiments of the present disclosure are illustrated below with 7 examples.

Example 1

The example 1 is an example of the paging method provided the present disclosure.

In a communication system, the base station supports at least one wireless access scheme, such as 2G, 3G and 4G. In a wireless access scheme, the base station supports at least one wireless interface, such as the eMTC wireless interface and the NB-IoT wireless interface. The base station issues the paging approach supported by the base station to the eMTC wireless interface and the NB-IoT wireless interface respectively. The paging approach supported by the base station includes whether the NB-IoT wireless interface supports paging with the wake-up signal, and whether the eMTC wireless interface supports sending the paging message on the N PRBs. In this example, N is equal to 1.

So-called paging with the wake-up signal may select part of the paging occasions (POs) to send the wake-up signal, or may additionally determine some new POs to send the wake-up signal. The wake-up signal is used for indicating the terminal whether to listen for the paging message at following POs. In a case where the core network determines that no downlink service occurs in next period of time, the core network sends the wake-up signal for paging to indicate a behavior of the terminal. After receiving indication information, the terminal does not listen for the paging message at following POs until reception of a next wake up signal.

A bandwidth of an eMTC narrowband system is 1.4 MHz. For a low-power terminal such as the eMTC terminal, if the terminal listens for the bandwidth of 1.4 MHZ at the POs, large power consumption will be caused inevitably. If the paging message is only sent within a frequency band of one PRB, the terminal only needs to listen for the bandwidth of 180 kHz at each PO. This may further reduce the power consumption caused by listening for the paging message.

In other examples, the base station may send the paging message on N PRBs, and the paging capacity of the terminal may include listening for the paging message on M PRBs. N and M are positive integers less than 7, and M is greater than or equal to N.

Example 2

The example 2 is an example in which the base station issues the paging capacity supported by the base station in the paging method provided by the present disclosure.

The base station issues the paging capacity to the terminal in at least one of manners described below.

The base station issues the paging capacity information and/or paging approach preference information through the broadcast message.

The base station delivers the paging capacity information and/or paging approach preference information through the dedicated signaling.

In the manner in which the base station issues the paging capacity information and/or paging approach preference information through the broadcast message, the base station broadcasts the system message which carries the paging capacity information and/or paging approach preference information in a cell.

In the manner in which the base station delivers the paging capacity information and/or paging approach preference information through the dedicated signaling, such as in a Radio Resource Control (RRC) release connection process, the base station carries the paging capacity information and/or paging approach preference information in a RRC release message. In addition, the base station needs to deliver the paging capacity information and/or paging approach preference information to the MME through the S1 interface. During the subsequent paging process, the MME needs to carry the paging capacity information and/or paging approach preference information to the base station in the paging message. The base station sends the paging message based on the paging capacity information and/or paging approach preference information, and the paging capacity of the terminal.

Example 3

The example 3 is an example in which the resident mode of the terminal in the idle status is determined in the paging method provided by the present disclosure.

The base station may support the wireless access scheme with CE or the wireless access scheme without CE. In addition, the terminal may support the wireless access scheme with CE or the wireless access scheme without CE. Therefore, the base station and the terminal need to negotiate a resident system. In a case where both the base station and the terminal support the wireless access scheme with CE, the terminal resides in priority in the wireless access scheme with CE. In a case where the terminal is the LTE terminal supporting the CE, and the base station supports the CE, the terminal resides in priority in an eMTC narrowband scheme. In a case where the base station does not support the CE, the terminal resides in a LTE scheme.

Example 4

The example 4 is an example in which the base station indicates the resident mode to the terminal in the paging method provided by the present disclosure.

The base station indicates the resident mode to the terminal in at least one of manners described below.

The base station broadcasts the resident mode information and/or resident mode preference indication information through the system message.

The base station indicates the resident mode information and/or resident mode preference indication information through the dedicated signaling.

In the manner in which the base station broadcasts the resident mode information and/or resident mode preference indication information through the system message, the base station broadcasts the system message which carries the resident mode information and/or resident mode preference indication information in a cell.

The manner in which the base station delivers the resident mode information and/or resident mode preference indication information through the dedicated signaling includes: the base station delivers the resident mode information and/or resident mode preference indication information to an UE, and the base station needs to deliver the resident mode information and/or resident mode preference indication information to the MME through the S1 interface; the MME needs to carry the resident mode information and/or resident mode preference indication information to the base station in the paging message during the subsequent paging process; the base station sends the paging message based on the resident mode information and/or resident mode preference indication information.

Example 5

The example 5 is an example in which the terminal reports the paging capacity of the terminal in the paging listening method provided by the present disclosure.

The terminal reports the paging capacity of the terminal in at least one of manners described below.

The terminal performs the pass-through of the paging capacity carried by the non-access stratum (NAS) signaling to the base station, to enable the base station to deliver the paging capacity to the MME through the S1 interface.

The terminal delivers the paging capacity carried by the access stratum (AS) signaling to the base station, to enable the base station to deliver the paging capacity to the MME through the S1 interface.

In a case where the terminal performs the pass-through of the paging capacity carried by the NAS signaling to the base station, such as in a Tracking Area Update (TAU) process, the terminal performs the pass-through of the paging capacity to the base station through a NAS message, and the base station delivers the paging capacity to the MME through the S1 interface. In the subsequent paging process, the MME delivers the paging capacity of the terminal to the base station through the paging message, to enable the base station to acquire the paging capacity of the terminal.

In a case where the terminal delivers the paging capacity carried by the AS signaling to the base station, such as in a Radio Resource Control (RRC) connection establishment process, the paging capacity of the terminal is carried in a RRC signaling, the base station delivers the paging capacity to the MME through the S1 interface. In the subsequent paging process, the MME delivers the paging capacity of the terminal to the base station, to enable the base station to acquire the paging capacity of the terminal.

Example 6

The example 6 is an example in which the base station sends the paging message in the paging method provided by the present disclosure.

The base station receives and demodulates the paging message issued by the MME for paging capacity of the terminal. In addition, if the paging message includes the resident mode of the terminal (such as resident mode information and/or resident mode preference indication information), the base station sends the paging message according to the negotiated paging capacity in the negotiated resident mode. In a case where the terminal is an LTE terminal supporting the CE and supports the paging capacity of one PRB (i.e., supports listening for the paging message within a frequency band of one PRB), and the base station supports the CE and the paging capacity of one PRB (i.e., supports sending the paging message within the frequency band of one PRB), the base station sends the paging message to the eMTC terminal on one PRB.

In a case where the terminal is the NB-IoT terminal supporting the paging capacity with the wake-up signal, and the base station supports the paging capacity with the wake-up signal, the base station sends the wake-up signal at a PO for the wake-up signal.

Example 7

The example 7 is an example of the paging listening method provided by the present disclosure.

The terminal receives the resident mode information and/or resident mode preference indication information issued by the base station in at least one of manners described below.

The terminal receives the paging capacity information and/or paging approach preference information issued by the base station through the broadcast message.

The terminal receives the paging capacity information and/or paging approach preference information supported by the base station delivered through the dedicated signaling.

The terminal further receives the paging capacity information and/or paging approach preference information sent by the base station in at least one of manners described below.

The terminal receives the resident mode information and/or resident mode preference indication information broadcast through the system message.

The terminal receives the resident mode information and/or resident mode preference indication information indicated through the dedicated signaling.

The terminal determines the paging listening approach according to paging capacity of the base station and paging capacity of the terminal. The terminal determines a resident system according to the resident mode indicated by the base station. Finally, the terminal listens for the paging message according to the determined paging listening approach in the determined resident system.

Figure 5:
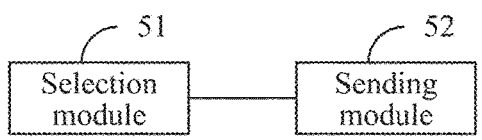
FIG. 5 is a schematic diagram of a paging apparatus of embodiment 4.

In embodiment 4, as shown in FIG. 5, a paging apparatus is configured in a base station. includes a selection module 51 and a sending module 52.

The selection module 51 is configured to select a paging approach according to paging capacity of a terminal and paging capacity supported by the base station.

The sending module 52 is configured to send a paging message through the selected paging approach.

In an implementation, in a case where the terminal is a Narrowband-Internet of Things (NB-IoT) terminal, the paging capacity of the terminal may include whether the terminal supports paging with a wake-up signal; in a case where the terminal is an Enhanced Machine Type of Communication (eMTC) terminal, the paging capacity of the terminal may include whether the terminal supports listening for the paging message on a number M of physical resource blocks (PRBs), where M is a positive integer less than 7. M may be, but not limited to, 1.

In an implementation, the paging capacity supported by the base station may include whether an NB-IoT wireless interface supports paging with the wake-up signal, and whether an eMTC wireless interface supports sending the paging message on a number N of PRBs, where N is a positive integer less than 7. N may be, but not limited to, 1.

In an implementation, the sending module may further issue the paging capacity supported by the base station in at least one of manners described below.

The sending module issues the paging capacity supported by the base station through a broadcast message.

The sending module delivers the paging capacity supported by the base station through a dedicated signaling.

The paging capacity supported by the base station may be represented as at least one of paging capacity information or paging approach preference information.

In this implementation, the manner in which the sending module delivers the paging capacity supported by the base station through the dedicated signaling may include a step described below.

The sending module delivers the paging capacity supported by the base station to the terminal through the dedicated signaling, and delivers the paging capacity supported by the base station to a Mobility Management Entity (MME) through an S1 interface.

The paging apparatus may further include an acquisition module.

The acquisition module is configured to acquire the paging capacity supported by the base station from a paging message sent by the MME.

In an implementation, the base station may support at least one wireless access scheme, where the at least one wireless access scheme includes a wireless access scheme with coverage enhancement (CE) and a wireless access scheme without CE.

In an implementation, the paging apparatus may further include an indication module.

The indication module is configured to indicate a resident mode to the terminal in at least one of manners described below.

The indication module broadcasts the resident mode through a system message.

The indication module indicates the resident mode through a dedicated signaling.

The resident mode may be represented as at least one of resident mode information or resident mode preference indication information.

In this implementation, the manner in which the resident mode indicates the resident mode through the dedicated signaling may include a step described below.

The indication module delivers resident mode information to the terminal through the dedicated signaling, and delivers the resident mode to the MME through the S1 interface.

The paging apparatus may further includes an acquisition module.

The acquisition module may be configured to acquire the resident mode from the paging message sent by the MME.

In this implementation, the step in which the sending module sends the paging message through the selected paging approach may include a step described below.

The sending module determines, according to the resident mode indicated to the terminal, a system for the terminal in an idle status to reside or reside in priority, and sends the paging message in the system resided or resided in priority by the terminal. In a case of sending the paging message in a system resided in priority by the terminal, the sending module continues paging in at least one system supported by both the terminal and the base station after a paging failure.

In this implementation, the step in which the sending module determines the system for the terminal in the idle status to reside or reside in priority may include a step described below.

In a case where both the base station and the terminal support the wireless access scheme with CE, the sending module determines the terminal to reside in priority in the wireless access scheme with CE. In a case where the base station does not support the wireless access scheme with CE, the sending module determines the terminal to reside in a Long Term Evolution (LTE) scheme.

In an implementation, the step in which the selection module selects the paging approach according to the paging capacity of the terminal and the paging capacity supported by the base station may include a step described below.

The selection module receives and demodulates a paging message issued by a core network for the paging capacity of the terminal. In a case where the terminal is the NB-IoT terminal, the terminal supports paging with the wake-up signal and the base station supports paging with the wake-up signal in an NB-IoT system, the selection module selects a paging approach with the wake-up signal for paging. In a case where the terminal is the eMTC terminal, the terminal supports listening for the paging message on the M PRBs and the base station supports sending the paging message on the N PRBs in an eMTC system, the selection module selects to send the paging message on the N PRBs, where M and N are positive integers less than 7 and M is greater than or equal to N.

M and N may be, but not limited to, 1.

Other implementation details of this embodiment may be referred to the embodiment 1.

In embodiment 5, a paging equipment is configured in a base station. The paging equipment includes a memory and a processor.

Executable instructions are included in the memory. The processor, when executing the executable instructions, performs operations described below.

A paging approach is selected according to paging capacity of a terminal and paging capacity supported by the base station.

A paging message is sent through the selected paging approach.

In an implementation, in a case where the terminal is a Narrowband-Internet of Things (NB-IoT) terminal, the paging capacity of the terminal may include whether the terminal supports paging with a wake-up signal; in a case where the terminal is an Enhanced Machine Type of Communication (eMTC) terminal, the paging capacity of the terminal includes whether the terminal supports listening for the paging message on a number M of physical resource blocks (PRBs), where M is a positive integer less than 7. M may be, but not limited to, 1.

In an implementation, the paging capacity supported by the base station may include whether an NB-IoT wireless interface supports paging with the wake-up signal, and whether an eMTC wireless interface supports sending the paging message on a number N of PRBs, where N is a positive integer less than 7. N may be, but not limited to, 1.

In an implementation, the processor, when executing the executable instructions, may further perform an operation described below.

The paging capacity supported by the base station is issued in at least one of manners described below.

The paging capacity supported by the base station is issued through a broadcast message.

The paging capacity supported by the base station is delivered through a dedicated signaling.

The paging capacity supported by the base station may be represented as at least one of paging capacity information or paging approach preference information.

In this implementation, the manner in which the paging capacity supported by the base station is delivered through the dedicated signaling may include steps described below.

The paging capacity supported by the base station is delivered to the terminal through the dedicated signaling, and the paging capacity supported by the base station is delivered to a Mobility Management Entity (MME) through an S1 interface.

The processor, when executing the executable instructions, may further perform an operation described below.

The paging capacity supported by the base station is acquired from a paging message sent by the MME.

In an implementation, the base station may support at least one wireless access scheme, where the at least one wireless access scheme includes a wireless access scheme with coverage enhancement (CE) and a wireless access scheme without CE.

In an implementation, the processor, when executing the executable instructions, may further perform an operation described below.

A resident mode is indicated to the terminal in at least one of manners described below.

The resident mode is broadcasted through a system message.

The resident mode is delivered through a dedicated signaling.

The resident mode may be represented as at least one of resident mode information or resident mode preference indication information.

In this implementation, the manner in which the resident mode is delivered through the dedicated signaling may include steps described below.

Resident mode information is delivered to the terminal through the dedicated signaling, and the resident mode is delivered to the MME through the S1 interface.

The processor, when executing the executable instructions, may further perform an operation described below.

The resident mode is acquired from a paging message sent by the MME.

In this implementation, the operation in which the paging message is sent through the selected paging approach may include operations described below.

The base station determines, according to the resident mode indicated to the terminal, a system for the terminal in an idle status to reside or reside in priority, and sends the paging message in the system resided or resided in priority by the terminal.

In a case of sending the paging message in a system resided in priority by the terminal, the base station continues paging in at least one system supported by both the terminal and the base station after a paging failure.

In this implementation, the step in which the system for the terminal in the idle status to reside or reside in priority is determined may include a step described below.

In a case where both the base station and the terminal support the wireless access scheme with CE, the base station determines the terminal to reside in priority in the wireless access scheme with CE. In a case where the base station does not support the wireless access scheme with CE, the base station determines the terminal to reside in a Long Term Evolution (LTE) scheme.

In an implementation, the operation in which the paging approach is selected according to the paging capacity of the terminal and the paging capacity supported by the base station may include an operation described below.

The processor receives and demodulates a paging message issued by a core network for the paging capacity of the terminal. In a case where the terminal is the NB-IoT terminal, the terminal supports paging with the wake-up signal and the base station supports paging with the wake-up signal in an NB-IoT system, a paging approach with the wake-up signal is selected for paging. In a case where the terminal is the eMTC terminal, the terminal supports listening for the paging message on the M PRBs and the base station supports sending the paging message on the N PRBs in an eMTC system, N PRBs are selected for sending the paging message, where M and N are positive integers less than 7 and M is greater than or equal to N.

M and N may be, but not limited to, 1.

Other implementation details of this embodiment may be referred to the embodiment 1.

Figure 6:
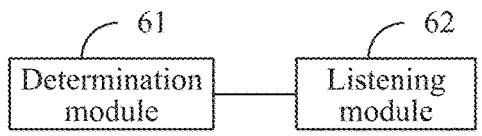
FIG. 6 is a schematic diagram of a paging listening apparatus of embodiment 6.

In embodiment 6, as shown in FIG. 6, a paging listening apparatus is configured in a terminal. The paging listening apparatus includes a determination module 61 and a listening module 62.

The determination module 61 is configured to determine a paging listening approach according to paging capacity supported by the terminal and paging capacity supported by a base station.

The listening module 62 is configured to listen for a paging message according to the determined paging listening approach.

In an implementation, the paging listening apparatus may further include a paging capacity acquisition module.

The paging capacity acquisition module is configured to, before the determination module determines the paging listening approach according to the paging capacity supported by the terminal and the paging capacity supported by the base station, acquire the paging capacity supported by the base station in at least one of manners described below.

The paging capacity acquisition module acquires the paging capacity supported by the base station through receiving a system message carrying the paging capacity.

The paging capacity acquisition module acquires the paging capacity supported by the base station through demodulating a dedicated signaling for the paging capacity carried by the dedicated signaling.

The paging capacity supported by the base station may be represented as at least one of paging capacity information or paging approach preference information.

In an implementation, the paging listening apparatus may further include a receiving module.

The receiving module is configured to receive a resident mode indicated by the base station in least one of manners described below.

The receiving module receives the resident mode carried by a system message from the base station.

The receiving module receives the resident mode carried by a dedicated signaling from the base station.

The resident mode may be represented as at least one of resident mode information or resident mode preference indication information.

In an implementation, the paging listening apparatus may further include a resident system determination module.

The resident system determination module is configured to, in a case where the terminal is a Long Term Evolution (LTE) terminal supporting coverage enhancement (CE), is compatible with an LTE system and an Enhanced Machine Type of Communication (eMTC) system, and is capable of listening for the paging message on a Physical Downlink Control Channel (PDCCH) or a Machine Physical Downlink Control Channel (MPDCCH) of inter-machine communication, determine to reside in the eMTC system in priority and listen for the paging message on the MPDCCH in priority according to the received resident mode indicated by the base station.

In an implementation, the step in which the determination module determines the paging listening approach according to the paging capacity supported by the terminal and the paging capacity supported by the base station may include steps described below.

In a case where the terminal is a Narrowband-Internet of Things (NB-IoT) terminal, and the terminal and the base station support paging with a wake-up signal, the determination module determines to listen for the wake-up signal and determines whether to continue to listen for the paging message at a paging occasion.

In a case where the terminal is an eMTC terminal, the terminal supports listening for the paging message on a number M of physical resource blocks (PRBs) and the base station supports sending the paging message on a number N of PRBs, the determination module determines to listen for the paging message on the M PRBs, where M and N is a positive integer less than 7 and M is greater than or equal to N.

M and N may be, but not limited to, 1.

In an implementation, the paging listening apparatus may further include a reporting module.

The reporting module is configured to report the paging capacity of the terminal in at least one of manners described below.

The reporting module performs pass-through of the paging capacity carried by a non-access stratum signaling to the base station, to enable the base station to deliver the paging capacity to a Mobility Management Entity (MME) through an S1 interface.

The reporting module delivers the paging capacity carried by an access stratum signaling to the base station, to enable the base station to deliver the paging capacity to the MME through the S1 interface.

Other implementation details of this embodiment may be referred to the embodiment 2.

In embodiment 7, a paging listening equipment is configured in a terminal. The paging listening equipment includes a memory and a processor.

Executable instructions are included in the memory. The processor, when executing the executable instructions, performs operations described below.

A paging listening approach is determined according to paging capacity supported by the terminal and paging capacity supported by a base station.

A paging message is listened for according to the determined paging listening approach.

In an implementation, before the processor executes the executable instructions to determine the paging listening approach according to the paging capacity supported by the processor and the paging capacity supported by the base station, the processor may further perform an operation described below.

The paging capacity supported by the base station is acquired in at least one of manners described below.

The paging capacity supported by the base station is acquired through receiving a system message carrying the paging capacity.

The paging capacity supported by the base station is acquired through demodulating a dedicated signaling for the paging capacity carried by the dedicated signaling.

The paging capacity supported by the base station may be represented as at least one of paging capacity information or paging approach preference information.

In an implementation, the processor, when executing the executable instructions, may further perform an operation described below.

A resident mode indicated by the base station is received in at least one of manners described below.

The resident mode carried by a system message from the base station is received.

The resident mode carried by a dedicated signaling from the base station is received.

The resident mode may be represented as at least one of resident mode information or resident mode preference indication information.

In an implementation, the processor, when executing the executable instructions, may further perform an operation described below.

In a case where the terminal is a Long Term Evolution (LTE) terminal supporting coverage enhancement (CE), is compatible with an LTE system and an Enhanced Machine Type of Communication (eMTC) system, and is capable of listening for the paging message on a Physical Downlink Control Channel (PDCCH) or a Machine Physical Downlink Control Channel (MPDCCH) of inter-machine communication, it is determined to reside in the eMTC system in priority and listen for the paging message on the MPDCCH in priority according to the received resident mode indicated by the base station.

In an implementation, the operation in which the paging listening approach is determined according to the paging capacity supported by the terminal and the paging capacity supported by the base station may include operations described below.

In a case where the terminal is a Narrowband-Internet of Things (NB-IoT) terminal, and the terminal and the base station support paging with a wake-up signal, it is determined to listen for the wake-up signal and it is determined whether to listen for the paging message at a paging occasion.

In a case where the terminal is an Enhanced Machine Type of Communication (eMTC) terminal, the terminal supports listening for the paging message on a number M of physical resource blocks (PRBs) and the base station supports sending the paging message on a number N of PRBs, it is determined to listen for the paging message on the M PRBs, where M and N are positive integers less than 7 and M is greater than or equal to N.

M and N may be, but not limited to, 1.

In an implementation, the processor, when executing the executable instructions, may further perform an operations described below.

The paging capacity of the terminal is reported in at least one of manners described below.

Pass-through of the paging capacity carried by a non-access stratum signaling is performed to the base station, to enable the base station to deliver the paging capacity to a Mobility Management Entity (MME) through an S1 interface.

The paging capacity carried by an access stratum signaling is delivered to the base station, to enable the base station to deliver the paging capacity to the MME through the S1 interface.

Other implementation details of this embodiment may be referred to the embodiment 2.

Figure 7:
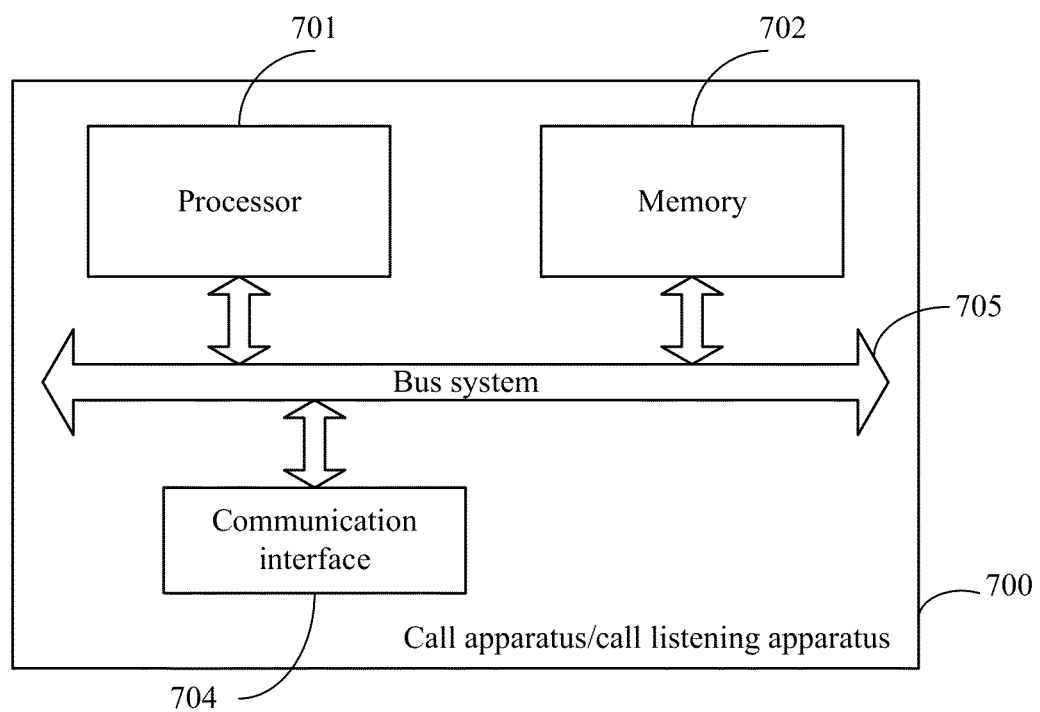
FIG. 7 is a hardware structure diagram of a call apparatus or a call listening apparatus of another embodiment of the present disclosure.

FIG. 7 is a hardware structure diagram of a call apparatus or a call listening apparatus of another embodiment of the present disclosure. The call apparatus or call listening apparatus 700 includes at least one processor 701, a memory 702 and at least one communication interface 704. Various components of the call apparatus or call listening apparatus 700 are coupled together through a bus system 705. It may be understood that the bus system 705 is used for implementing connection and communication among these components. Besides a data bus, the bus system 705 further includes a power bus, a control bus and a state signal bus. However, for clarity of description, the various buses are labeled as bus system 705 in FIG. 7.

It may be understood that the memory 702 may be a volatile memory or a non-volatile memory, or may include both the volatile memory and the non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a disk or a Compact Disc Read-Only Memory (CD-ROM). The magnetic surface memory may be a disk storage or a tape storage. The volatile memory may be a Random Access Memory (RAM), which is used as an external cache. Many forms of RAM, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM) are available by way of example but not limitation. The memory 702 described in the embodiments of the present disclosure is intended to include, but not limited to, these and any other appropriate types of memory.

The memory 702 in the embodiment of the present disclosure is used for storing various types of data, so as to support an operation of a call apparatus or call listening apparatus 700. An operating system 7021 includes varies system programs, such as a framework layer, a core library layer, a driver layer, for implementing various basic services and handling hardware-based tasks. An application 7022 may include varies applications for implementing varies application services. A program for implementing the method of the embodiments of the present disclosure may be included in the application 7022.

The method disclosed in the embodiments of the present disclosure may be applied to the processor 701 or be implemented by the processor 701. The processor 701 may be an integrated circuit chip with signal processing capacity. In an implementation process, the steps of the above methods may be completed by the integrated logic circuit in a hardware form or instructions in a software form in the processor 701. The processor 701 mentioned above may be a general processor, a Digital Signal Processor (DSP) or other programmable logic devices, discrete gates or transistor logic devices, discrete hardware components, etc. The processor 701 may implement or execute each method, step and logic block diagram disclosed in the embodiments of the present disclosure. The general processor may be a microprocessor or any conventional processor. The steps of the methods disclosed in the embodiments of the present disclosure may be directly executed by a hardware decoding processor, or by the combination of hardware and software modules in a decoding processor. The software modules may be located in a storage medium, and the storage medium is located in the memory 702. The processor 701 reads information in the memory 702, and completes the steps mentioned above in combination with the hardware of the processor 701.

In an exemplary embodiment, the call apparatus or call listening apparatus 700 may be used for implementing the aforementioned methods by at least one of an Application Specific Integrated Circuit (ASIC), a DSP, a Programmable Logic Device (PLD), a Complex Programmable Logic Device (CPLD), a Field-Programmable Gate Array (FPGA), a general processor, a controller, a Micro Controller Unit (MCU), a Microprocessor or other electronic components.

An embodiment of the present disclosure further provides a storage medium. Computer programs are stored in the storage medium. The computer programs, when executed by a processor, perform operations described below.

A paging approach is selected according to paging capacity of a terminal and paging capacity supported by the base station.

A paging message is sent through the selected paging approach.

In an embodiment of the present disclosure, in a case where the terminal is a Narrowband-Internet of Things (NB-IoT) terminal, the paging capacity of the terminal includes whether the terminal supports paging with a wake-up signal. In a case where the terminal is an Enhanced Machine Type of Communication (eMTC) terminal, the paging capacity of the terminal includes whether the terminal supports listening for the paging message on a number M of physical resource blocks (PRBs), where M is a positive integer less than 7.

In an embodiment of the present disclosure, the paging capacity supported by the base station includes whether an NB-IoT wireless interface supports paging with the wake-up signal, and whether an eMTC wireless interface supports sending the paging message on a number N of PRBs, where N is a positive integer less than 7.

In an embodiment of the present disclosure, the computer programs, when executed by a processor, perform an operation described below.

The paging capacity supported by the base station is issued in at least one of manners described below.

The paging capacity supported by the base station is issued through a broadcast message.

The paging capacity supported by the base station is delivered through a dedicated signaling.

The paging capacity supported by the base station is represented as at least one of paging capacity information or paging approach preference information.

In an embodiment of the present disclosure, the base station delivers the paging capacity supported by the base station to a terminal through the dedicated signaling, and delivers the paging capacity supported by the base station to a Mobility Management Entity (MME) through an S1 interface.

The computer programs, when executed by a processor, perform an operation of acquiring the paging capacity supported by the base station from a paging message sent by the MME.

In an embodiment of the present disclosure, the base station supports at least one wireless access scheme, where the at least one wireless access scheme includes a wireless access scheme with coverage enhancement (CE) and a wireless access scheme without CE.

In an embodiment of the present disclosure, the computer programs, when executed by a processor, perform an operation of indicating a resident mode to the terminal in at least one of manners described below.

The resident mode is broadcasted through a system message.

The resident mode is indicated through a dedicated signaling.

The resident mode is represented as at least one of resident mode information or resident mode preference indication information.

In an embodiment of the present disclosure, the computer programs, when executed by a processor, performs operations described below.

Resident mode information is delivered to the terminal through the dedicated signaling, and the resident mode is delivered to the MME through the S1 interface.

The resident mode is acquired from a paging message sent by the MME.

In an embodiment of the present disclosure, the computer programs, when executed by a processor, performs operations described below.

According to the resident mode indicated to the terminal, a system for the terminal in an idle status to reside or reside in priority is determined, and the paging message is sent in the system resided or resided in priority by the terminal.

In a case of sending the paging message in a system resided in priority by the terminal, paging is continued in at least one system supported by both the terminal and the base station after a paging failure.

In an embodiment of the present disclosure, the computer programs, when executed by a processor, performs an operation described below.

In a case where both the base station and the terminal support the wireless access scheme with CE, the terminal is determined to reside in priority in the wireless access scheme with CE. In a case where the base station does not support the wireless access scheme with CE, the terminal is determined to reside in a Long Term Evolution (LTE) scheme.

In an embodiment of the present disclosure, the computer programs, when executed by a processor, performs an operation described below.

The paging message issued by a core network is received and demodulated for the paging capacity of the terminal. In a case where the terminal is the NB-IoT terminal, the terminal supports paging with the wake-up signal and the base station supports paging with the wake-up signal in an NB-IoT system, the paging approach with the wake-up signal is selected for paging. In a case where the terminal is the eMTC terminal, the terminal supports listening for the paging message on the M PRBs and the base station supports sending the paging message on the N PRBs in an eMTC system, it is selected to send the paging message on the N PRBs, where M and N are positive integers less than 7 and M is greater than or equal to N.

In an embodiment of the present disclosure, M is equal to 1, and N is equal to 1.

An embodiment of the present disclosure further provides another storage medium. The computer programs are stored in the storage medium. The computer programs, when executed by a processor, perform operations described below.

A paging listening approach is determined according to paging capacity supported by the terminal and paging capacity supported by a base station. A paging message is listened for according the determined paging listening approach.

In an embodiment of the present disclosure, the computer programs, when executed by a processor, perform an operation described below.

The paging capacity supported by the base station is acquired in at least one of manners described below.

The paging capacity supported by the base station is acquired through receiving a system message carrying the paging capacity.

The paging capacity supported by the base station is acquired through demodulating a dedicated signaling for the paging capacity carried by the dedicated signaling.

The paging capacity supported by the base station is represented as at least one of paging capacity information or paging approach preference information.

In an embodiment of the present disclosure, the computer programs, when executed by a processor, perform an operation described below.

A resident mode indicated by the base station is received in at least one of manners described below.

The resident mode carried by a system message from the base station is received.

The resident mode carried by a dedicated signaling from the base station is received.

The resident mode is represented as at least one of resident mode information or resident mode preference indication information.

In an embodiment of the present disclosure, the computer programs, when executed by a processor, perform an operation described below.

In a case where the terminal is a Long Term Evolution (LTE) terminal supporting coverage enhancement (CE), is compatible with an LTE system and an Enhanced Machine Type of Communication (eMTC) system, and is capable of listening for the paging message on a Physical Downlink Control Channel (PDCCH) or a Machine Physical Downlink Control Channel (MPDCCH) of inter-machine communication, it is determined to reside in the eMTC system in priority and listens for the paging message on the MPDCCH in priority according to the received resident mode indicated by the base station.

In an embodiment of the present disclosure, the computer programs, when executed by a processor, perform an operation described below.

In a case where the terminal is a Narrowband-Internet of Things (NB-IoT) terminal, and the terminal and the base station support paging with a wake-up signal, it is determined to listen for the wake-up signal and it is determined whether to listen for the paging message at a paging occasion.

In a case where the terminal is an eMTC terminal, the terminal supports listening for the paging message on a number M of physical resource blocks (PRBs) and the base station supports sending the paging message on a number N of PRBs, it is determined to listen for the paging message on the M PRBs, where M and N are positive integers less than 7 and M is greater than or equal to N.

In an embodiment of the present disclosure, M is equal to 1, and N is equal to 1.

In an embodiment of the present disclosure, the computer programs, when executed by a processor, perform an operation described below.

The paging capacity of the terminal is reported in at least one of manners described below.

The pass-through of the paging capacity carried by a non-access stratum signaling is performed to the base station, to enable the base station to deliver the paging capacity to a Mobility Management Entity (MME) through an S1 interface.

The paging capacity carried by an access stratum signaling is delivered to the base station, to enable the base station to deliver the paging capacity to the MME through the S1 interface.

Although the embodiments disclosed in the present disclosure are described above, the above is only for understanding the embodiments of the present disclosure and is not intended to limit the present disclosure. Any of those skilled in the art may make any modification and change in forms and details of implementation without departing from the spirit and scope disclosed by the present disclosure. However, the scope of patent protection of the present disclosure shall still be subject to the scope defined in the claims.

INDUSTRIAL APPLICABILITY

The present disclosure provides a paging method including steps described below. A base station selects a paging approach according to paging capacity of a terminal and paging capacity supported by the base station, and sends a paging message according to the selected paging approach. A terminal determines a paging listening approach according to paging capacity supported by the terminal and paging capacity supported by a base station, and listens for the paging message according to the determined paging listening approach. In this way, the power consumption of the terminal can be reduced, especially the power consumption of a low-power terminal can be effectively reduced, so as to save electrical energy and extend working hours of the terminal.

What is claimed is:

1. A paging method, comprising:
   selecting, by a base station, a paging approach according to paging capacity of a terminal and paging capacity supported by the base station, and
   sending, by the base station, a paging message through the selected paging approach,
   wherein the method further comprises:
   indicating, by the base station, a resident mode to the terminal in at least one manner of a group consisting of:
   broadcasting the resident mode through a system message; or
   indicating the resident mode through a dedicated signaling;
   wherein the resident mode is represented as at least one of resident mode information or resident mode preference indication information,
   wherein sending, by the base station, the paging message through the selected paging approach comprises:
   determining, by the base station, according to the resident mode indicated to the terminal, a system for the terminal in an idle status to reside or reside in priority, and sending the paging message in the system resided or resided in priority by the terminal; and
   in a case of sending the paging message in a system resided in priority by the terminal, continuing, by the base station, paging in at least one system supported by both the terminal and the base station after a paging failure.

2. The paging method of claim 1, wherein
   in a case where the terminal is a Narrowband-Internet of Things (NB-IoT) terminal, the paging capacity of the terminal comprises whether the terminal supports paging with a wake-up signal.

3. The paging method of claim 1, further comprising:
   issuing, by the base station, the paging capacity supported by the base station in at least one manner of a group consisting of:
   issuing the paging capacity supported by the base station through a broadcast message, or
   delivering the paging capacity supported by the base station through a dedicated signaling;
   wherein the paging capacity supported by the base station is represented as at least one of paging capacity information or paging approach preference information.

4. The paging method of claim 3, wherein delivering the paging capacity supported by the base station through the dedicated signaling comprises:
   delivering, by the base station, the paging capacity supported by the base station to a terminal through the dedicated signaling, and delivering the paging capacity supported by the base station to a Mobility Management Entity (MME) through an S1 interface;
   wherein the paging method further comprises:
   acquiring, by the base station, the paging capacity supported by the base station from a paging message sent by the MME.

5. The paging method of claim 1, wherein
   the base station supports at least one wireless access scheme, wherein the at least one wireless access scheme comprises a wireless access scheme with coverage enhancement (CE) and a wireless access scheme without CE.

6. The paging method of claim 1, wherein indicating the resident mode through the dedicated signaling comprises:
   delivering, by the base station, resident mode information to the terminal through the dedicated signaling, and delivering the resident mode to an MME through an S1 interface; and
   wherein the paging method further comprises:
   acquiring, by the base station, the resident mode from a paging message sent by the MME.

7. The paging method of claim 1, wherein determining, by the base station, the system for the terminal in the idle status to reside or reside in priority comprises:
   in response to determining that both the base station and the terminal support a wireless access scheme with CE, determining that the terminal resides in priority in the wireless access scheme with CE;
   in response to determining that the base station does not support the wireless access scheme with CE, determining that the terminal resides in a Long Term Evolution (LTE) scheme.

8. The paging method of claim 1, wherein selecting, by the base station, the paging approach according to the paging capacity of the terminal and the paging capacity supported by the base station comprises:
   receiving and demodulating, by the base station, a paging message issued by a core network for the paging capacity of the terminal.

9. A paging apparatus, configured in a base station, comprising:
   a processor; and a memory for storing instructions executable by the processor, wherein instructions, when executed by the processor, are configured to implement the method of claim 1.

10. The paging apparatus of claim 9, wherein the instructions, when executed by the processor, are configured to:

receive and demodulate a paging message issued by a core network for the paging capacity of the terminal.

11. A non-transitory computer-readable storage medium, wherein executable programs are stored in the storage medium, the executable programs, when executed by a processor, implement the paging method of claim 1.

\* \* \* \* \*